UNITED STATES PATENT OFFICE.

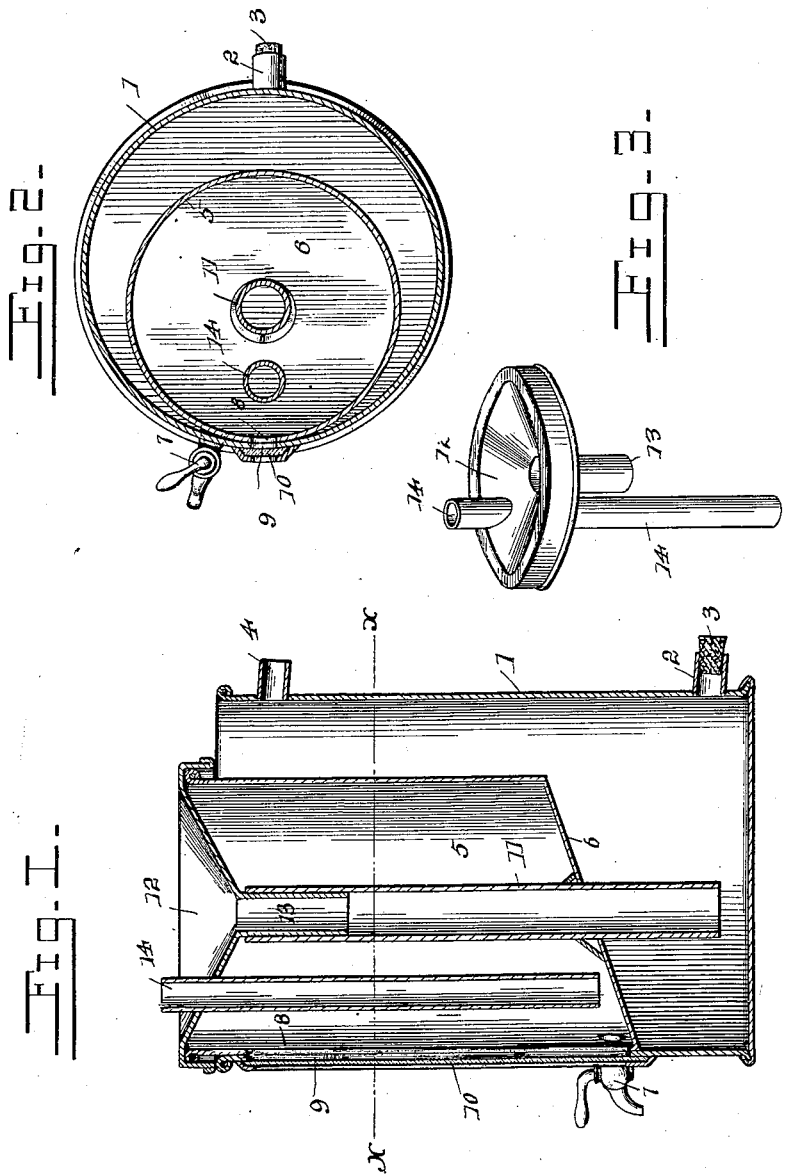

JAMES M. KING, OF NEBRASKA CITY, NEBRASKA.

CREAM-SEPARATOR.

SPECIFICATION forming part of Letters Patent No. 650,537, dated May 29, 1900.

Application filed September 27, 1899. Serial No. 731,837. (No model.)

*To all whom it may concern:*

Be it known that I, JAMES M. KING, a citizen of the United States, residing at Nebraska City, in the county of Otoe and State of Nebraska, have invented a new and useful Cream-Separator, of which the following is a specification.

This invention relates to cream-separators of that class which employ a liquid agent of lower temperature than the milk to separate the cream therefrom, and has for one object to provide an improved device in which the milk-containing receptacle is fixedly inclosed within the outer receptacle which contains the cooling agent, whereby the milk-receptacle is maintained in contact with the cooling agent and at the same time permits of the drawing off of the milk and the cream without removing the milk-containing receptacle.

A further object of the invention is to permit of additional milk being introduced into the milk-receptacle without disturbing the cream after the latter has been partly or wholly separated from the milk.

To these ends the present invention consists in the combination and arrangement of parts, as will be hereinafter more fully described, shown in the accompanying drawings, and particularly pointed out in the appended claims, it being understood that changes in the form, proportion, size, and the minor details of construction may be made within the scope of the appended claims without departing from the spirit or sacrificing any of the advantages of the present invention.

In the drawings, Figure 1 is a longitudinal sectional view of a cream-separator constructed in accordance with the present invention. Fig. 2 is a horizontal sectional view thereof, taken on the line $x\ x$ of Fig. 1. Fig. 3 is a detail perspective view of the cover for the milk-containing receptacle.

Corresponding parts in the several figures of the drawings are designated by like characters of reference.

Referring to the accompanying drawings, 1 designates the exterior receptacle, preferably cylindrical in shape, closed at the bottom and open at the top and adapted to contain water as the cooling agent. Near the bottom of the can or receptacle 1 there is provided a drain spout or passage 2, which is normally closed by means of a suitable plug 3. Projecting laterally from near the upper end of the receptacle 1 is an overflow spout or passage 4, through which the water may overflow, so as to prevent intermingling of the water with the milk.

Located within the receptacle 1 is the milk-containing receptacle or can 5, which is preferably cylindrical in shape and is connected to one side of the receptacle 1. The bottom 6 of the milk-receptacle preferably inclines downwardly toward the contiguous sides of the two receptacles, and a suitable valve or spigot 7 is located exteriorly of the outer receptacle near the lower end of the inner receptacle and communicating with the interior of the latter, so that the contents thereof may be readily drawn off without removing the inner receptacle. At the point of contact of the contiguous walls of the two receptacles the latter are provided with alined longitudinal slots 8 and 9, respectively, and a suitable glass cover 10 is provided upon the outer side of the outer receptacle, whereby said slots are closed and the interior of the inner receptacle is exposed to view. A suitable vertical scale may be provided at opposite sides of the glass cover, so as to gage the amount of milk and cream in the inner receptacle. Projecting centrally through the bottom of the inner receptacle is a vertical tube 11, the upper open end of which terminates near the top of the receptacle, and the lower open end extends downwardly nearly to the bottom of the outer receptacle.

A dished cover 12 is provided for the upper open end of the inner receptacle and is provided with a short central tube 13, which is adapted to fit within the open upper end of the tube 11, so as to permit of water being poured into the dished or funnel-shaped cover and conveyed therefrom centrally through the inner receptacle and discharged into the outer receptacle. Located at one side of the tube or funnel-spout 13 is another upright tube 14, fixed to the cover 12 and projecting both above and below the same, the lower open end of said tube terminating close to the bottom of the inner receptacle, and is preferably arranged near the lowest portion thereof.

In the operation of the device the milk is introduced into the inner receptacle through the milk-inlet tube 14, and the water, which is of lower temperature than the milk, is poured into the outer receptacle either through the funnel-shaped cover 12 or through the open top of the receptacle 1 at one side of the inner receptacle. After the desired quantity of milk has been placed in the device the upper open end of the milk-inlet tube 14 is closed in any suitable manner, so as to prevent ingress of dirt or other foreign matter. By reason of the difference in temperature between the water and the milk the cream will be separated from the latter and rise to the surface thereof, this separation being conveniently discernible through the glass-covered slots 8 and 9. After the separation has taken place the milk is first drawn off through the spigot 7, the glass cover 10 permitting of the operation being observed, so as to prevent mixing of the milk and cream, as will be readily understood. It is preferable to pour the water through the central tube 11, as the cooling effect of the water is had at the center of the milk as well as upon the exterior thereof, although this tube may be dispensed with, as desired. After the first introduction of milk other milk may be poured into the inner receptacle, as such milk will be discharged from the inlet-tube 14 at a point near the bottom of the receptacle, whereby the cream upon the surface of the milk will not be agitated or otherwise affected.

It is preferable to incline the bottom of the inner receptacle toward the contiguous sides of both receptacles, so that the valve or spigot 7 may be conveniently located at the lowest point of the milk-containing receptacle, whereby the contents of the latter may be entirely drawn off, as will be understood. Also the lower discharge end of the milk-inlet tube 14 is preferably located as near as possible to the lowest portion of the bottom of the inner receptacle, so that the milk which is added to that already in the receptacle will be discharged at the lowest point, so as not to disturb the cream, as hereinbefore set forth.

What I claim is—

1. A cream-separator, comprising an outer receptacle, an inner receptacle having a tube or passage open at its upper end to receive water, and communicating through the inner receptacle and with the outer receptacle, a milk tube or passage, carried by the inner receptacle, and discharging at or near the lower end thereof, and means for drawing off the liquid contents of the inner receptacle, and located at or near the bottom thereof, substantially as and for the purpose described.

2. A cream-separator, comprising an outer receptacle, and an inner receptacle having a dished top or cover, a tube communicating with an opening formed in the top or cover and also opening into the interior of the outer receptacle, a milk-inlet tube extending through the top or cover, and means for drawing off the liquid contents of the inner receptacle, substantially as shown and described.

3. A cream-separator, comprising an outer receptacle, and an inner receptacle having a vertical tube projecting in opposite directions through the bottom thereof, a removable funnel-shaped cover having its spout communicating with the upper end of the tube, and also a vertical tube extending in opposite directions through the cover, and means for drawing off the liquid contents of the inner receptacle, substantially as shown and described.

4. A cream-separator, comprising an outer receptacle, an inner receptacle fixed to one side of the outer receptacle and spaced above the bottom thereof, the contiguous sides of both receptacles being provided with vertically-alined and glass-covered slots, a central tube extending in opposite directions through the bottom of the inner receptacle, a removable funnel-shaped cover for the inner receptacle, the spout of the cover communicating with the upper end of the central tube, a vertical tube extending in opposite directions through the cover and terminating at its lower end near the bottom of the inner receptacle, and a valve or spigot located exteriorly of the device, near the lower end of the inner receptacle, and communicating with the interior of the latter, substantially as and for the purpose set forth.

In testimony that I claim the foregoing as my own I have hereto affixed my signature in the presence of two witnesses.

JAMES M. KING.

Witnesses:
J. C. ROBERTSON,
F. D. COLLINS.